US008384521B2

(12) United States Patent
Matsen et al.

(10) Patent No.: US 8,384,521 B2
(45) Date of Patent: Feb. 26, 2013

(54) SYSTEMS, METHODS, AND APPARATUS FOR RFID TAG DETECTION

(75) Inventors: Marc Rollo Matsen, Seattle, WA (US);
Donald Dabelstein, Renton, WA (US);
David B. Blackwell, Seattle, WA (US);
William Preston Geren, Shoreline, WA (US); Arun Ayyagari, Seattle, WA (US);
Kevin Yong Ung, Bellevue, WA (US);
Craig F. Battles, Seattle, WA (US);
Jason Bommer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 12/200,673

(22) Filed: Aug. 28, 2008

(65) Prior Publication Data

US 2010/0052911 A1    Mar. 4, 2010

(51) Int. Cl.
*H04Q 5/22* (2006.01)
*G08B 13/14* (2006.01)
(52) U.S. Cl. ............... 340/10.1; 340/572.1; 340/572.7
(58) Field of Classification Search ............ 340/10.1
See application file for complete search history.

(56) References Cited

U.S. PATENT DOCUMENTS

| | | | | |
|---|---|---|---|---|
| 5,221,831 | A * | 6/1993 | Geiszler | 235/440 |
| 6,304,629 | B1 * | 10/2001 | Conway et al. | 378/68 |
| 6,883,710 | B2 | 4/2005 | Chung | |
| 7,369,049 | B1 * | 5/2008 | De Gennaro et al. | 340/572.1 |
| 2003/0189094 | A1 | 10/2003 | Trabitz | |
| 2003/0193445 | A1 * | 10/2003 | Mejia et al. | 343/867 |
| 2004/0195306 | A1 * | 10/2004 | Carlson | 235/375 |
| 2005/0110674 | A1 * | 5/2005 | Mendolia et al. | 342/81 |
| 2005/0230603 | A1 * | 10/2005 | Langland | 250/221 |
| 2006/0043177 | A1 * | 3/2006 | Nycz et al. | 235/385 |
| 2006/0212164 | A1 * | 9/2006 | Abraham et al. | 700/215 |
| 2006/0220857 | A1 | 10/2006 | August et al. | |
| 2007/0115123 | A1 | 5/2007 | Roberts et al. | |
| 2007/0152826 | A1 * | 7/2007 | August et al. | 340/572.1 |
| 2007/0188305 | A1 * | 8/2007 | Drucker | 340/10.4 |
| 2007/0290811 | A1 | 12/2007 | Tuttle | |
| 2007/0290853 | A1 | 12/2007 | Tuttle | |
| 2007/0290854 | A1 | 12/2007 | Tuttle | |
| 2008/0094214 | A1 * | 4/2008 | Azevedo et al. | 340/568.1 |
| 2010/0039230 | A1 * | 2/2010 | Voutilainen et al. | 340/10.1 |

OTHER PUBLICATIONS

Collaborati on for NDT Education, Conductivity and Resistivity Values for Aluminum and Allows, NDT (Non destructive testing) Resource Center, Mar. 2002. See http://www.ndt-ed.org/AboutThisSite/aboutthissite.htm.*

* cited by examiner

*Primary Examiner* — Brian Zimmerman
*Assistant Examiner* — Cal Eustaquio
(74) *Attorney, Agent, or Firm* — Armstrong Teasdale, LLP

(57) ABSTRACT

A system for tracking objects that include radio frequency identification (RFID) tags associated therewith. The system including a structure substantially defining an enclosure, a reflective interior of the enclosure configured for the reflection of radio signals, at least one conveyor belt that transports the objects through the structure, at least one RFID reader panel inside the structure, wherein the at least one RFID reader panel transmits a radio signal into the interior of the structure such that the radio signal will reflect off of the interior of the structure to increase a probability that the RFID tags associated with the objects that enter the structure are read, and an operator terminal that receives and stores information regarding read RFID tags from the at least one reader panel.

25 Claims, 3 Drawing Sheets

SYSTEMS, METHODS, AND APPARATUS FOR RFID TAG DETECTION

BACKGROUND

The present disclosure relates generally to radio frequency identification (RFID) systems, methods, and apparatus. More particularly, the present disclosure relates to systems, methods, and apparatus for improving detection of RFID tags for identification and tracking of baggage.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item, for example baggage.

Currently, airlines are implementing RFID monitoring capabilities at airports to track baggage to ensure the baggage gets to the correct destination. These implementations have experienced difficulty in achieving 100% read success due the fact the RFID tags are not always oriented in an optimum position on a piece of baggage in order to achieve a successful read. Thus, if an RFID tag is not optimally read, the bag associated with the unread RFID tag must be manually removed from a conveyor belt and manually taken to a proper location, which is extremely time consuming for both the person manually taking the baggage to a destination and the process itself.

An existing solution is to put multiple readers and/or to position baggage in a particular orientation to try to ensure an optimal read is made. However, extra readers and elaborate baggage orientation devices adds cost.

Accordingly, a need is present for a method and apparatus to minimize improper reads of RFID tags or overcome issues discussed above.

SUMMARY

Described herein are systems, methods, and apparatus for improving detection of RFID tags for identification and tracking of baggage.

In embodiments, described is a system for tracking at least one object that includes at least one radio frequency identification (RFID) tag. The system including a structure having an interior and radio frequency reflective walls, at least one RFID reader panel that transmits a radio signal into the interior and is operable to read the at least one RFID tag in the interior, and an operator terminal that receives and stores information regarding a read RFID tag from the at least one RFID reader panel.

In further embodiments, described is an apparatus for detecting a radio frequency identification (RFID) tag. The apparatus includes a structure having an interior and radio frequency reflective walls, a first opening that allows a transport of at least one object with at least one RFID tag into the interior at least one RFID reader panel that transmits a radio signal into the interior and is operable to read at least one RFID tag in the interior, and a second opening that allows the transport of the at least one object out of the structure.

In still further embodiments, described is a method for tracking at least one object that includes at least one radio frequency identification (RFID) tag. The method includes transmitting radio signals from one or more RFID reader panels into an interior of a structure having radio frequency reflective walls, and receiving an indication that the one or more RFID reader panels has successfully read the at least one RFID tag.

DETAILED DESCRIPTION

The subject matter of the present disclosure is described with specificity herein to meet statutory requirements. However, the description itself is not intended to limit the scope of this patent. Rather, the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

Figure 1:
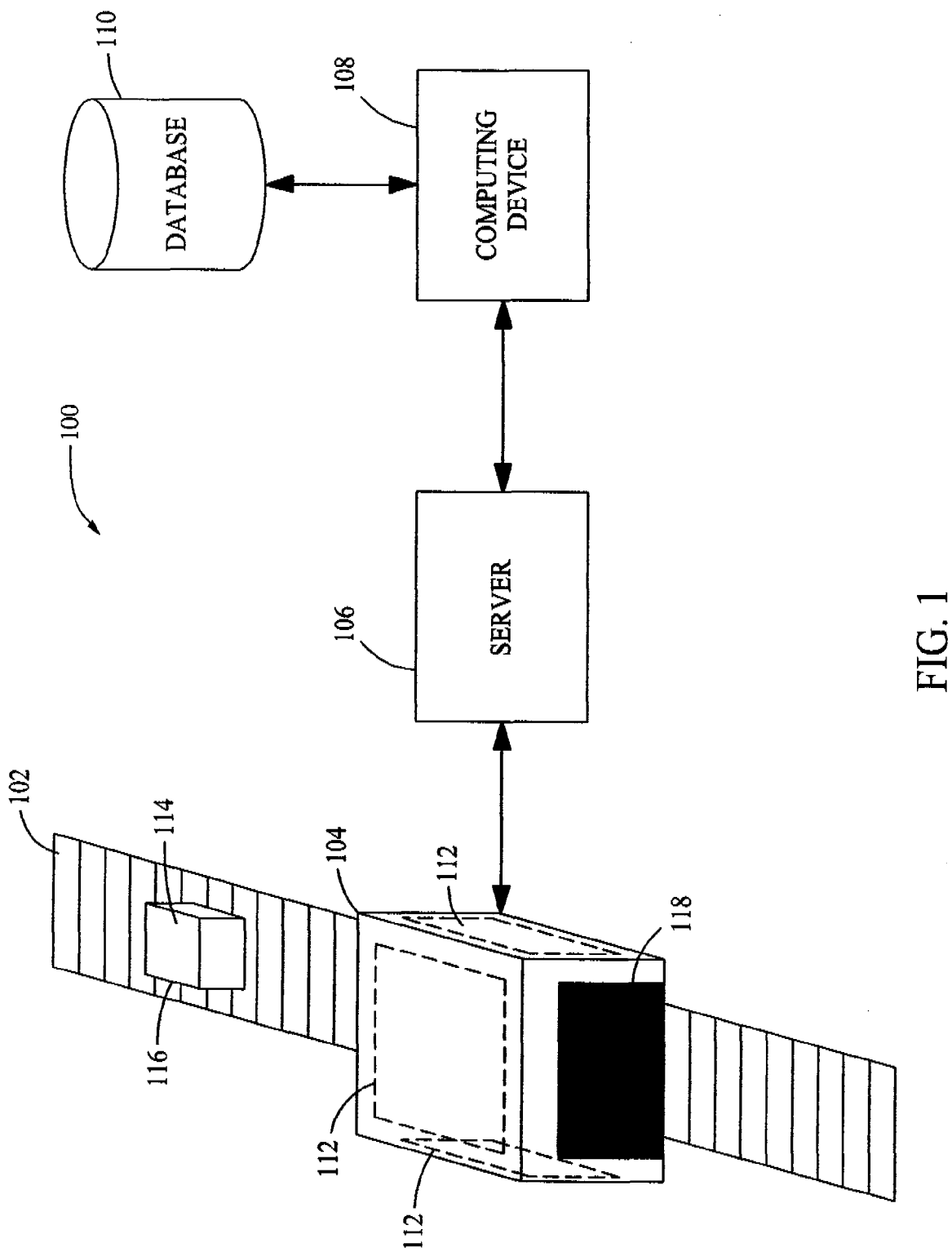
FIG. 1 is a block diagram illustrating an exemplary operating environment for tracking objects that include RFID tags associated therewith.

Referring initially to FIG. 1, an exemplary operating environment is shown and designated generally as radio frequency identification (RFID) system 100. In embodiments, the RFID system 100 includes a structure 104 (described in further detail below) that includes a reflective interior (not shown) and one or more RFID reader panels 112. Once baggage 114 enters the structure 104 via conveyor belt 102, the RFID reader panels 112 transmit radio signals (see FIG. 2) that are to be received by RFID tag 116 on the baggage 114. One of ordinary skill in the art will appreciate that using the structure 104 to read RFID tags on baggage is merely one possible example and the same system may be used for any application that involves a reading of any group of items that are streaming through a particular location. Thus, although the term "baggage" is used throughout the present disclosure for exemplary purposes, the term "baggage" may be any single item or a group of items.

Referring back to FIG. 1, the RFID tag 116, upon receiving a radio signal, transmits a response radio signal (not shown) that is received by the RFID reader panels 112. The response radio signal includes data stored in the RFID tag 116, for example and without limitation, a unique I.D. number, a terminal number, a gate number, and a flight number. In embodiments, a reader panel may have split functions, where one section of the reader panel is operable to transmit radio signals, and where another section of the reader panel is operable to receive a response radio signal from the RFID tag 116. For example, the reader panel may include a single antenna with a circulator to allow the antenna to both transmit the radio signal and receive the response radio signal from the RFID tag 116. In further embodiments, the reader panel may function entirely as a transmitter or a receiver. For example, the reader panel may include an antenna for transmitting the radio signal or an antenna for receiving the response radio signal from the RFID tag 116. In embodiments, the structure 104 includes one or more reflective curtains 118 that limit propagation of radio signals transmitted from the RFID reader panels 112 and further enhance the enclosed environment created by the structure 104. In further embodiments, more than one structure 104 may be included with the RFID system 100. Therefore, a first structure may be used to read the RFID tag 116 on the baggage 114, which may direct the baggage 114 to another structure, and so on, until the baggage 114 reaches a proper destination.

In the embodiment of FIG. 1, the RFID reader panels 112 are coupled to a server 106, which, in turn, is coupled to an operator terminal, for example, computing device 108. The computing device 108 is coupled to a database 110. The database 110 may be implemented by a computer processing system that includes at least one storage device for storing the database 110. The data received by the RFID reader panels 112 (via the response radio signal) is transmitted to the server 106. The data can also be transmitted to the computing device 108 and stored in the database 110.

Figure 2:
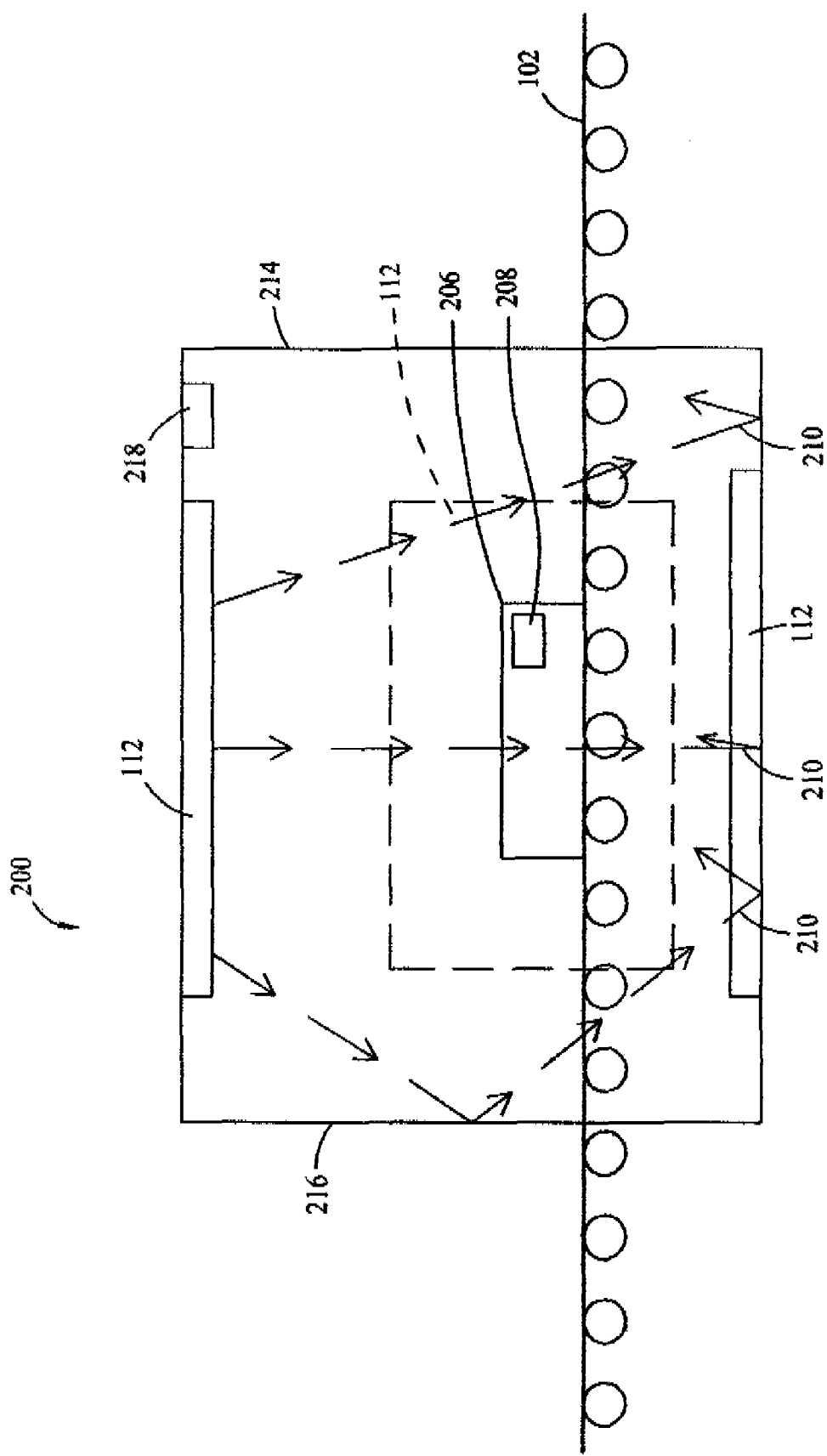
FIG. 2 is a s a cross-sectional view of a structure for tracking objects that include RFID tags associated therewith.

FIG. 2 is a cross-sectional view of the structure 104. As shown in FIG. 2, the RFID reader panels 112 transmit radio signals 210 that are to be received by a RFID tag 208 on baggage 206. In embodiments, the structure includes four reader panels, one above the conveyor belt 102, one below the conveyor belt 102, and one on each side of the conveyor belt 102. However, one of ordinary skill in the art will appreciate that any number of reader panels may be used. In embodiments, the structure 104 also includes a recognition component 218 that provides information as to whether a piece of baggage is present inside of the structure 104. In embodiments, the recognition component 218 is, without limitation, one of the following: an optical recognition component, an electromechanical contractor, and relay.

As mentioned above, RFID tags are not always oriented in an optimum position on a piece of baggage to achieve a successful read from a radio signal transmitted from a reader panel. To overcome this problem, and as shown in FIG. 2, the radio signals 210 emanate from the RFID reader panels 112 and either illuminate/excite the RFID tag 208 or, if the RFID tag 208 is not optimally oriented, the radio signals 210 pass by and are then reflected from, for example, a side wall, a floor, and/or a ceiling of the structure 104. Thus, using the reflective nature of the structure 104 to reflect and reuse the radio signals 210 to create a multitude of communication paths with many different orientations between the RFID reader panels 112 inside the structure 104, an optimal read of the RFID tag 208 affixed to the baggage 206 may be obtained. Therefore, no matter what the orientation of the baggage 206 may be as the baggage 206 travels through the structure 104 via the conveyor belt 102, an optimal read of the RFID tag 208 maybe obtained.

One of ordinary skill in the art will appreciate that the interior and/or exterior shape of the structure 104 as shown in FIGS. 1 and 2 is for illustrative purposes only and many other shapes of the structure 104, such as a cylinder or a rectangle, are well within the, scope of the present disclosure. Although dimensions of the structure 104 (i.e., length, width, and height) are important design parameters for good performance, the structure 104 may be any shape that ensures optimal reflection of radio signals toward a piece of baggage within the structure 104. For example, the structure 104 should provide a good sampling of resonances over about 860 MHz to about 960 MHz RFID frequency range. These resonances are frequencies for which an RFID tag may be strongly excited and provide a good reading. If not optimally designed, the resonances may exhibit large gaps over which the RFID tags will not be strongly excited. Table 1 and Table 2 (below) are illustrative examples of poor and good selections, respectively, of structure dimensions for a rectangular structure. Exemplary modes for poor selection of structure dimensions are, for example, 8 feet long, 4 feet wide, and 2 feet high (see Table 1). Exemplary structure dimensions to obtain non-degenerate modal field distributions are, for example, 7.9 feet long, 4.1 feet wide, and 3.1 feet high (see Table 2). In embodiments, dimensions of the structure 104 do not share a common factor, such as a factor of 2 as seen in Table 1 (e.g., cavity modes 8'×4'×2' are each a factor of "2").

TABLE 1

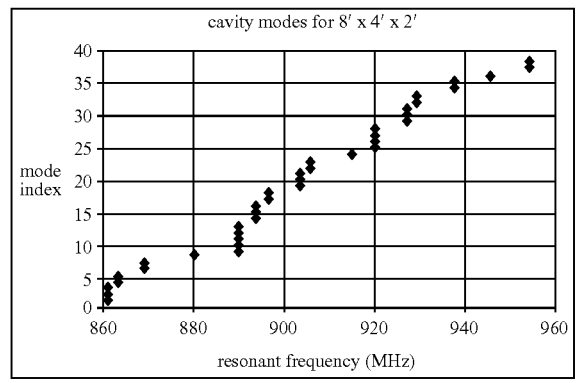

TABLE 2

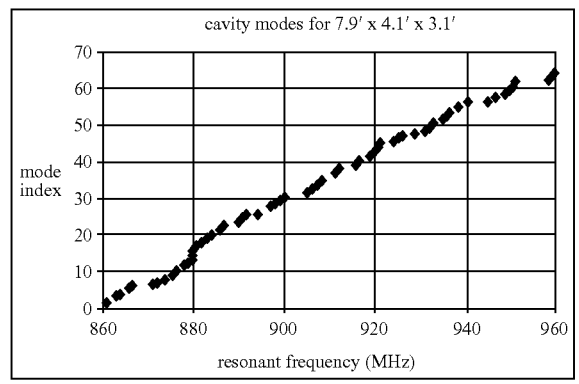

Further, a non-reflective/nonconductive interior of the structure 104 may be made reflective/conductive by lining walls of the interior of the structure 104 with light weight reflective/conductive materials. For example, a light weight structure may be made with light weight foam board coated with silver-coated paint or aluminum foil that is applied to the interior of the light weight structure. In certain embodiments, the interior of the structure 104 is made of a material with a minimum conductivity of about 10E4 (S/m) to about 10E8 (S/m), for example, aluminum, nickel, copper, galvanized steel, and the like. However, one of ordinary skill in the art will appreciate that many other reflective materials may be used.

In the embodiment of FIG. 2, only one piece of baggage may enter the structure 104 at a time. Thus, once the RFID reader panels 112 achieve a successful read of the RFID tag 208 on the baggage 206, the baggage 206 exits the structure at opening 216 and a next piece of baggage enters at opening 214 where the process is then repeated. In further embodiments, the structure 104 is large enough for multiple pieces of baggage to enter at one time as well as large enough to include more than one conveyor belt.

In addition to using the reflective nature of the structure 104 to reflect and reuse the radio signals 210, the structure 104 also holds the radio signals 210 internally not allowing the radio signals 210 to emanate as readily and therefore cause electromagnetic interference in the surrounding areas. Further, the structure 104 eliminates the possibility of reading RFID tags on baggage in the surrounding area by virtue of a closed environment thus created. As mentioned above, the structure includes one or more reflective curtains 118 that further enhance the enclosed environment created by the structure 104. The one or more reflective curtains 118 are located at the openings 214 and 216 and limit the propagation of radio signals, for example radio signals 210. In further embodiments, the structure 104 includes flexible reflective curtains at the openings 214 and 216. In still further embodiments, the reflective curtains 118 are a reflective fabric.

Figure 3:
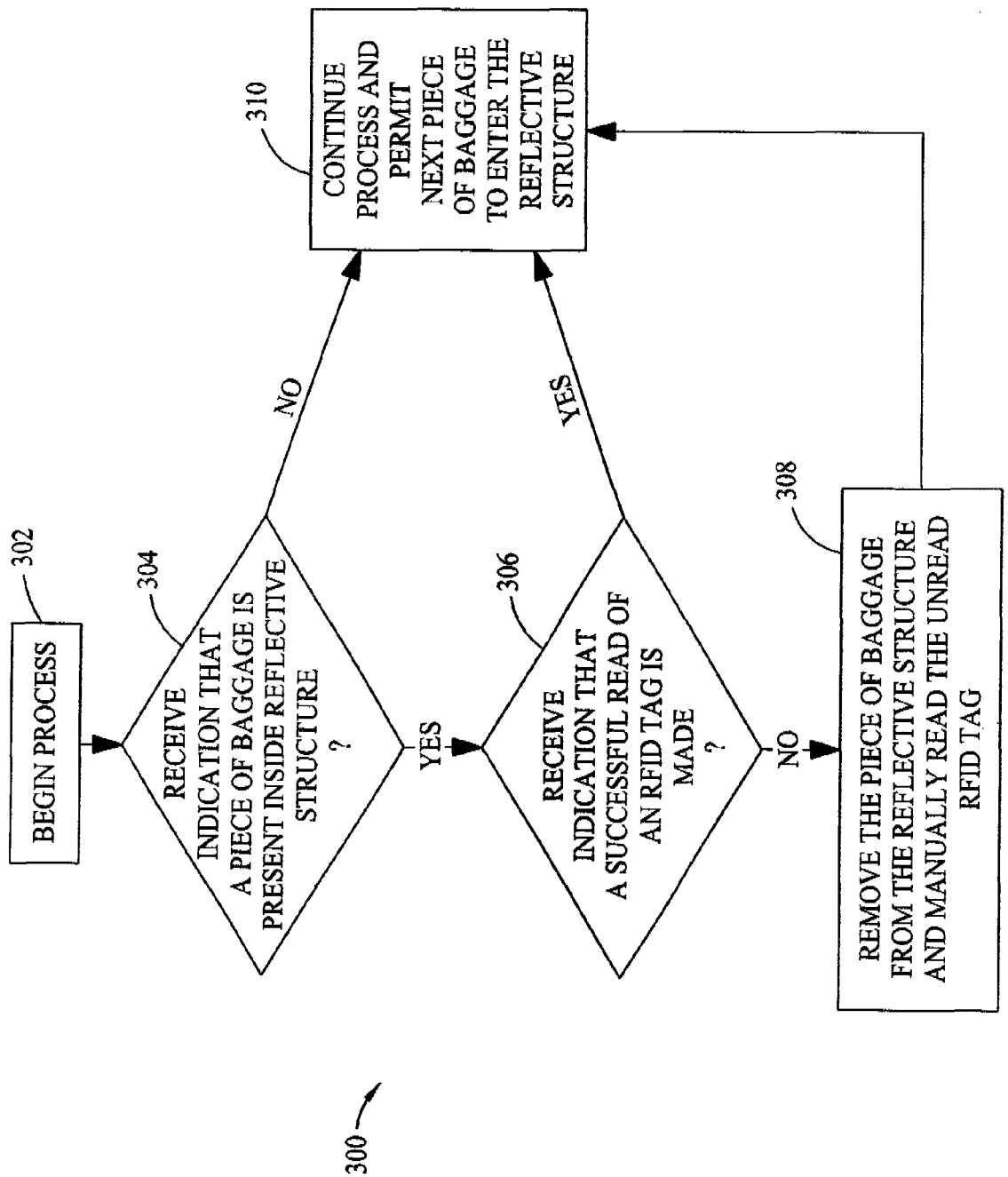
FIG. 3 is a flow diagram of an exemplary method for tracking objects that include RFID tags associated therewith.

Referring next to FIG. 3, a flow diagram 300 illustrates an exemplary method for tracking objects that include RFID tags associated therewith. Once the process of sending baggage through the structure 104 begins 302, an indication is received 304 by the structure 104 that a piece of baggage, for example the baggage 206, is present inside the structure 104. In embodiments, once the indication is received 304 by the structure 104 that the baggage 206 is present inside the structure, and with the reflective curtains 118 covering the openings 214 and 216, the RFID reader panels 112 may begin to transmit radio signals. In further embodiments, if the reflective curtains 118 are flexible, the reflective curtains 118 may allow the baggage 216 to enter the structure 104 by virtue of their flexibility while maintaining a substantially closed environment in the structure 104. If an indication is received 306 that a successful read of the RFID tag 208 is made, the process continues 310 and the next piece of baggage is permitted to enter the structure 104 through the opening 214 as the other piece of baggage that just received a successful read is removed 308 from the structure 104 through the opening 216. However, if there is no indication received that a successful read of the RFID tag 208 is made, in one embodiment, the baggage 206 may be manually removed 312, read, and taken to its proper destination. In further embodiments, if there is no indication received that a successful read of the RFID tag 208 was made, the baggage 206 is redirected on an alternate path for further verification, which may include manual verification or that the baggage 206 is sent through a further system 100 for RFID tag detection. An RFID tag may not be optimally read because, without limitation, the RFID tag may be damaged, partially or fully obscured, improperly attached, or has fallen off the baggage 206. Once the baggage 206 has been removed from the structure 104 or re-routed, the process continues 310 and the next piece of baggage is permitted to enter the structure 104 through the opening 214. In embodiments, a metering system may be used to ensure that each piece of baggage is optimally spaced to ensure that only one piece of baggage enters the structure 104 at a time. In further embodiments, more than one piece of baggage may enter the structure 104 at the same time.

This written description uses examples to disclose the claimed subject matter, including the best mode, and also to enable any person skilled in the art to practice the claimed subject matter, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for tracking at least one object that includes at least one radio frequency identification (RFID) tag, the system comprising:
   a structure comprising dimensions that do not share a common factor other than 1, the structure further comprising:
      a first side wall;
      a second side wall opposite the first side wall;
      a top coupled to the first side wall and the second side wall;
      a bottom opposite the top, the bottom coupled to the first side wall and the second side wall; and
      a radio frequency reflective interior defined by the side first wall, the second side wall, the top, and the bottom;
   at least one conveyor belt that transports the at least one object through the structure;
   at least one RFID reader panel coupled to the top of the structure and an additional RFID reader panel coupled to the bottom of the structure, wherein the at least one RFID reader panel and the additional RFID reader panel are configured to transmit a radio signal into the interior and are operable to read the at least one RFID tag in the interior; and
   an operator terminal that receives and stores information regarding a read RFID tag from the at least one RFID reader panel and the additional RFID reader panel
   a first opening that allows transport of at least one object with at least one RFID tag into the interior;
   a second opening that allows the transport of the at least one object out of the structure; and
   at least one reflective curtain at each of the first opening and the second opening, wherein the at least one reflective curtain limits propagation of the radio signal transmitted from the at least one RFID reader panel.

2. The system according to claim 1, wherein the at least one RFID reader panel transmits a radio signal into the interior such that the radio signal reflects off of the interior for the purpose of increasing a probability that the at least one RFID tag is read.

3. The system according to claim 1, wherein the at least one RFID reader panel is a movable RFID reader panel.

4. The system according to claim 1, wherein the at least one RFID panel comprises an antenna with a circulator to allow the antenna to both transmit the radio signal into the interior and to receive a response radio signal from the at least one RFID tag.

5. The system according to claim 1, wherein each of the first side wall, the second side wall, the top, and the bottom of the structure is made of a material with a minimum conductivity of 10E4 (S/m) to 10E8 (S/m).

6. An apparatus for detecting a radio frequency identification (RFID) tag, the apparatus comprising:
   a structure comprising dimensions that do not share a common factor other than 1:
      a first side wall;
      a second side wall opposite the first side wall;
      a top coupled to the first side wall and the second side wall;

a bottom opposite the top, the bottom coupled to the first side wall and the second side wall; and a radio frequency reflective interior defined by the first side wall, the second side wall, the top, and the bottom;

a first opening that allows transport of at least one object with at least one RFID tag into the interior;

at least one RFID reader panel coupled to the top of the structure and an additional RFID reader panel coupled to the bottom of the structure, wherein the at least one RFID reader panel and the additional RFID reader panel are configured to transmit a radio signal into the interior and are operable to read at least one RFID tag in the interior;

a second opening that allows the transport of the at least one object out of the structure;

at least one reflective curtain at each of the first opening and the second opening, wherein the at least one reflective curtain limits propagation of the radio signal transmitted from the at least one RFID reader panel; and at least one conveyor belt that transports the at least one object into the interior of the structure through the first opening and out of the interior of the structure through the second opening.

7. The apparatus according to claim 6, further comprising a recognition component that identifies when the at least one object is present inside of the structure.

8. The apparatus according to claim 7, wherein the recognition component is one of the following: an optical recognition component, an electro-mechanical contactor, and a relay.

9. The apparatus according to claim 6, wherein the radio signal transmitted from the at least one RFID reader reflects off of the interior to increase a probability that the at least one RFID tag on the at least one object that enters the structure is read.

10. The apparatus according to claim 6, wherein the at least one RFID reader panel comprises an antenna with a circulator to allow the antenna to both transmit the radio signal into the interior and to receive a response radio signal from the at lest one RFID tag.

11. The apparatus according to claim 6, further comprising an additional RFID reader panel, wherein the at least one RFID reader panel is coupled to the top of the structure and wherein the additional RFID reader panel is coupled to the bottom of the structure.

12. The apparatus according to claim 6, wherein each of the first side wall, the second side wall, the top, and the bottom of the structure is made of a material with a minimum conductivity of about 10E4 (S/m) to about 10E8 (S/m).

13. The apparatus according to claim 6, wherein the at least one reflective curtain is made of one of the following: aluminum, nickel, copper, and galvanized steel.

14. The apparatus according to claim 6, wherein the at least one reflective curtain is flexible.

15. The apparatus according to claim 6, wherein the at least one reflective curtain is a reflective fabric.

16. The apparatus according to claim 6, wherein a dimension of the structure facilitates non-degenerate model field distributions.

17. The apparatus according to claim 6, wherein dimensions of the structure do not have a common factor.

18. A method for tracking at least one object that includes at least one radio frequency identification (RFID) tag, the method comprising:

transmitting radio signals into an interior of a structure having dimensions that do not share a common factor other than 1, the radio frequency reflective interior defined by a first side wall, a second side wall opposite the first side wall, at top coupled to the first side wall and the second side wall, and a bottom opposite the top, the bottom coupled to the first side wall and the second side wall, wherein the radio signals are transmitted from a first RFID reader panel coupled to the top of the structure and a second RFID reader panel coupled to the bottom of the structure, the structure having a first opening that allows transport of at least one object with at least one RFID tag into the interior, a second opening that allows the transport of the at least one object out of the structure, and at least one reflective curtain at each of the first opening and the second opening, wherein the at least one reflective curtain limits propagation of the radio signal transmitted from the at least one RFID reader panel; and receiving an indication that at least one of the first RFID reader panel and the second RFID reader panel has successfully read the at least one RFID tag.

19. The method according to claim 18, further comprising removing the at least one object from the structure via a conveyor belt.

20. The method according to claim 18, wherein the radio signals reflect off of the interior to increase a probability that the at least one RFID tag is read.

21. The method according to claim 18, further comprising receiving an indication that that at least one object has entered the structure.

22. The method according to claim 18, further comprising receiving and indication that a successful read of the at least one RFID tag on the at least one object has not been made.

23. The method according to claim 22, further comprising manually removing the at least one object associated with the at least one unread RFID or redirecting the at least one object associated with the at least one unread RFID tag to an alternate path for further verification.

24. An apparatus having a radio frequency reflective interior for reflecting a radio signal transmitted from a radio frequency identification (RFID) reader panel to increase a probability that an RFID tag on an object is read, the apparatus comprising:

a structure defining the interior and having dimensions that do not share a common factor other than 1, the structure comprising:

a first side wall;

a second side wall opposite the first side wall;

a top coupled to the first side wall and the second side wall; and a bottom opposite the top, the bottom coupled to the first side wall and the second side wall;

a first opening that allows a transport of at least one object including at least one RFID tag into the interior;

a recognition component that identifies when the at least one object is present inside of the interior;

at least one RFID reader panel coupled to the top of the structure and an additional RFID reader panel coupled to the bottom of the structure, wherein the at least one RFID reader panel and the additional RFID reader panel are configured to transmit a radio signal into the interior and are operable to read at least one RFID tag in the interior;

a second opening that allows the transport of the at least one object out of the interior; and at least one reflective curtain at each of the first opening and the second opening, wherein the at least one reflective curtain limits the propagation of the radio signal transmitted from the at least one RFID reader panel and the additional RFID reader panel;

wherein the at least one RFID panel comprises an antenna with a circulator to allow the antenna to both transmit the radio signal into the interior and to receive a response radio signal from the at least one RFID tag; and wherein the radio frequency reflective walls are made of aluminum.

25. A method for tracking an object that includes a radio frequency identification (RFID) tag through a structure including dimensions that do not share a common factor other than 1, the structure with a radio frequency reflective interior defined by a first side wall, a second side wall opposite the first side wall, at top coupled to the first side wall and the second side wall, and a bottom opposite the top, the bottom coupled to the first side wall and the second side wall, the radio frequency reflective interior configured to facilitate reflecting a radio signal transmitted from a first RFID reader panel coupled to the top of the structure and a second RFID reader panel coupled to the bottom of the structure to increase a probability that the RFID tag on the object inside the structure is read, the method comprising:

receiving an indication that at least one object including at least one RFID tag has entered the structure;

transmitting radio signals from the first RFID reader panel and the second RFID reader panel into the interior of the structure;

covering a first opening and a second opening of the structure with one or more reflective curtains to limit propagation of the radio signals transmitted from the first RFID reader panel and the second RFID reader panel; and receiving an indication that at least one of the first RFID reader panel and the second RFID reader panel has successfully read the at least one RFID tag or receiving and indication that a successful read of the at least one RFID tag on the at least one object has not been made.

\* \* \* \* \*